United States Patent
Nakano

(10) Patent No.: US 9,904,145 B2
(45) Date of Patent: Feb. 27, 2018

(54) BLADE DRIVE DEVICE AND OPTICAL INSTRUMENT

(71) Applicant: SEIKO Precision Inc., Matsudo-shi, Chiba (JP)

(72) Inventor: Yoichi Nakano, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 15/634,326

(22) Filed: Jun. 27, 2017

(65) Prior Publication Data

US 2018/0004065 A1    Jan. 4, 2018

(30) Foreign Application Priority Data

Jun. 29, 2016  (JP) .................................. 2016-128789

(51) Int. Cl.
G03B 9/32    (2006.01)
G03B 9/08    (2006.01)

(52) U.S. Cl.
CPC ...................... *G03B 9/08* (2013.01)

(58) Field of Classification Search
USPC ......................................... 396/480, 484, 493
See application file for complete search history.

(56) References Cited

U.S. PATENT DOCUMENTS

| | | | | |
|---|---|---|---|---|
| 4,487,492 A * | 12/1984 | Toyoda | ............... | G03B 9/62 396/466 |
| 4,643,553 A * | 2/1987 | Fujino | ............... | G03B 9/18 396/469 |
| 4,994,834 A * | 2/1991 | Watabe | ............... | G03B 9/18 396/466 |
| 6,821,033 B2 * | 11/2004 | Sekizawa | ............... | H02K 26/00 310/400 |

(Continued)

FOREIGN PATENT DOCUMENTS

JP    2014-170022 A    9/2014

*Primary Examiner* — Rodney Fuller
(74) *Attorney, Agent, or Firm* — Brinks Gilson & Lione

(57) ABSTRACT

There are provided a blade drive device and an optical instrument. The blade drive device includes a substrate that has an opening, a front curtain and a rear curtain that are movable along an opening surface of the opening so as to open and close the opening, a front curtain locking portion that interlocks with opening and closing operations of the front curtain, a rear curtain locking portion that interlocks with opening and closing operations of the rear curtain, a regulation lever that is configured to be pivotally movable around a lever axis, that enters an operation trajectory of the front curtain locking portion and the rear curtain locking portion, and that is capable of entry and escape between an entry position for regulating the movement of the front curtain and the rear curtain in a closing direction and an escape position escaped from the operation trajectory, a regulation electromagnetic actuator that is configured to be rotatable around a regulation axis, and a linkage lever that causes the regulation lever to pivot around the lever axis in response to the rotation around the regulation axis of the regulation electromagnetic actuator. The regulation lever and the linkage lever engage with each other while being provided with play in a circumferential direction around the regulation axis.

8 Claims, 8 Drawing Sheets

(56) References Cited

U.S. PATENT DOCUMENTS

| | | | | |
|---|---|---|---|---|
| 8,025,448 B2 * | 9/2011 | Kim | ................... | G03B 9/40 396/452 |
| 2014/0016023 A1 * | 1/2014 | Min | ................... | H04N 5/2353 348/362 |
| 2015/0093105 A1 * | 4/2015 | Shintani | ................... | G03B 9/42 396/497 |
| 2016/0026069 A1 * | 1/2016 | Togo | ................... | G03B 9/64 396/456 |

* cited by examiner

BLADE DRIVE DEVICE AND OPTICAL INSTRUMENT

RELATED APPLICATIONS

This application claims priority under 35 U.S.C. §119 to Japanese Patent Application No. 2016-128789 filed on Jun. 29, 2016, the entire content of which is hereby incorporated by reference.

BACKGROUND OF THE INVENTION

Field of the Invention

The present invention relates to a blade drive device and an optical instrument.

Background Art

An optical instrument such as a digital camera is equipped with a focal plane shutter (hereinafter, referred to as an FP shutter) in order to control exposure to an imaging element. The FP shutter has a substrate which has an opening (picture frame), and a front curtain and a rear curtain which are movable along an opening surface of the opening so as to open and close the opening.

For example, JP-A-2014-170022 discloses a so-called electromagnetic drive-type FP shutter which actuates the front curtain and the rear curtain by using an electromagnetic actuator. Compared with a so-called spring drive-type FP shutter (system for actuating the front curtain and the rear curtain by using an attraction force generated by an electromagnet and a restoring force of a spring), the electromagnetic drive-type FP shutter has an advantage in that the FP shutter is miniaturized and simplified.

SUMMARY OF THE INVENTION

Incidentally, according to the FP shutter used for a mirrorless single lens camera or a digital single lens reflex camera, the front curtain and the rear curtain need to be located at each open position (state where the opening is fully opened) when the power is not supplied such as when the power is turned off. In this case, the above-described electromagnetic drive-type FP shutter holds the open position of the front curtain and the rear curtain by using a detent torque (magnetic attraction force in a state where power is not supplied) of the electromagnetic actuator.

However, according to the electromagnetic drive-type FP shutter in the related art, there is a possibility that the front curtain or the rear curtain may be unexpectedly moved in a closing direction due to a drop impact. Consequently, there is still room for improvement in that impact resistance has to be ensured while less power consumption and miniaturization have to be achieved.

Therefore, the invention is made in view of the above-described circumstances, and an object thereof is to provide a blade drive device and an optical instrument which can ensure the impact resistance while the less power consumption and the miniaturization can be achieved.

In order to solve the above-described problem, a blade drive device according to an aspect of the invention includes a substrate that has an opening, a first curtain and a second curtain that are movable along an opening surface of the opening so as to open and close the opening, a first locking portion that interlocks with opening and closing operations of at least the first curtain, a blade position holding member that is configured to be pivotally movable around a first axis extending in a first direction intersecting the opening surface, that enters an operation trajectory of the first locking portion in response to the opening and closing operations of the first curtain, and that is capable of entry and escape between an entry position for regulating the movement of the first curtain in a closing direction and an escape position escaped from the operation trajectory, an electromagnetic actuator that extends in the first direction, and that is configured to be rotatable around a second axis which is different from the first axis, and a linkage lever that connects the blade position holding member and the electromagnetic actuator to each other, and that causes the blade position holding member to pivot around the first axis in response to the rotation around the second axis of the electromagnetic actuator. The blade position holding member and the linkage lever engage with each other while being provided with play in a pivoting direction around the second axis of the linkage lever.

According to this configuration, the blade position holding member and the linkage lever engage with each other while being provided with play in the pivoting direction around the second axis of the linkage lever. Accordingly, when the linkage lever pivots, until the linkage lever and the blade position holding member engage with each other, the linkage lever runs idle with respect to the blade position holding member. Therefore, it is possible to reduce a load torque applied to the electromagnetic actuator. In this manner, miniaturization of the electromagnetic actuator can be achieved, and less power consumption of the blade drive device can be achieved. Since the blade position holding member and the linkage lever engage with each other while being provided with play in the pivoting direction around the second axis of the linkage lever, compared with a case where the blade position holding member is interlocked with a rotation operation of the electromagnetic actuator, it is possible to minimize a pivoting range of the blade position holding member with respect to an actuation angle of the electromagnetic actuator. In this manner, the electromagnetic actuator can be more freely selected, and the blade position holding member is likely to be set in a desired pivoting range with respect to the actuation angle of the electromagnetic actuator. In this regard, the blade drive device can be more freely designed.

In the aspect, the blade position holding member can be locked by the first locking portion at the entry position so as to regulate the movement of the first curtain in the closing direction. Accordingly, it is possible to restrain the first curtain from being unexpectedly moved in the closing direction due to a drop impact. In this manner, it is not necessary to increase a detent torque of the electromagnetic actuator in order to hold the first curtain at the open position. Therefore, a miniaturized device, a quickened shutter operation, and impact resistance can be realized.

In the aspect, the linkage lever may include a linkage pin which is loosely inserted into a guide hole of the blade position holding member. An inner peripheral surface of the guide hole may have a first engagement portion with which the linkage pin engages in response to one side pivoting movement around the second axis of the linkage lever, and a second engagement portion with which the linkage pin engages in response to the other side pivoting movement around the second axis of the linkage lever. Inside the guide hole in the pivoting direction of the linkage lever around the second axis, clearances between the linkage pin and the first engagement portion and between the linkage pin and the second engagement portion may configure idle running regions in which the linkage pin runs idle with respect to the blade position holding member in response to the pivoting movement around the second axis of the linkage lever.

According to this configuration, when the linkage lever pivots to one side around the second axis in a state where the linkage lever engages with the first engagement portion, the linkage lever engages with the second engagement portion after passing through the idle running region. Accordingly, the linkage lever and the blade position holding member pivot integrally with each other. When the linkage lever pivots to the other side around the second axis in a state where the linkage lever engages with the second engagement portion, the linkage lever engages with the first engagement portion after passing through the idle running region. Accordingly, the linkage lever and the blade position holding member pivot integrally with each other. In this manner, the above-described operation effect is more successfully achieved.

In the aspect, the inner peripheral surface of the guide hole may have an escape portion which escapes from contact with the linkage lever in a radial direction of the second axis.

According to this configuration, the inner peripheral surface of the guide hole has the escape portion which escapes from the contact with the linkage lever in the radial direction of the second axis. Accordingly, it is possible to reliably reduce a load torque applied to the electromagnetic actuator.

In the aspect, the blade drive device may further include a biasing member that biases the blade position holding member toward the escape position.

According to this configuration, it is possible to restrain rattling of the blade position holding member. Therefore, it is possible to restrain a shutter operation from being hindered by the blade position holding member after the blade position holding member unexpectedly enters the entry position.

In the aspect, at the entry position, the blade position holding member may be locked by the first locking portion in an open region in which the first curtain escapes from the opening when viewed in the first direction.

According to this configuration, it is possible to reliably restrain the first curtain from entering the inside of the opening. Therefore, for example, it is possible to reliably restrain the first curtain from appearing on a monitor of the optical instrument.

In the aspect, the first curtain and the second curtain respectively may have a plurality of blades. In an overlapped state where the plurality of blades are overlapped with each other when viewed in an opening direction of the opening, the plurality of blades escape from the opening so as to bring the first curtain and the second curtain to an open position. In an expanded state where the plurality of blades are expanded when viewed in the opening direction, the plurality of blades close the opening so as to bring the first curtain and the second curtain to a closed position.

According to this configuration, the plurality of blades are held at the open position in the overlapped state. Therefore, for example, compared with a case where a single blade opens and closes the opening, the respective blades can be miniaturized.

In the aspect, the blade drive device may further include a second locking portion that interlocks with the opening and closing operations of the second curtain. At the entry position, the blade position holding member may enter both an operation trajectory of the first locking portion operated in response to the opening and closing operations of the first curtain and an operation trajectory of the second locking portion operated in response to the opening and closing operations of the second curtain so as to regulate the movement of the first curtain and the second curtain in the closing direction.

According to this configuration, the blade position holding member can be locked by both the first curtain locking portion and the second curtain locking portion at the entry position. Accordingly, it is possible to restrain the first curtain and the second curtain from being unexpectedly moved in the closing direction due to a drop impact. In this manner, it is not necessary to increase a detent torque of the electromagnetic actuator in order to hold the first curtain and the second curtain at the open position. Therefore, a miniaturized device, a quickened shutter operation, and impact resistance can be realized.

Moreover, the movement of the first curtain and the second curtain in the closing direction can be regulated by the single blade position holding member. Therefore, compared with a case where the blade position holding member is disposed in each of the first curtain and the second curtain, the blade drive device can be miniaturized.

An optical instrument according to another aspect of the invention includes the blade drive device according to the aspect described above.

According to this configuration, the optical instrument includes the blade drive device according to the aspect described above. Therefore, it is possible to provide the optical instrument which is miniaturized and requires less power consumption while impact resistance is ensured.

According to the aspect of the invention, it is possible to provide the blade drive device and the optical instrument which are miniaturized and require less power consumption while impact resistance is ensured.

DETAILED DESCRIPTION OF THE INVENTION

Next, an embodiment according to the invention will be described with reference to the drawings.

Optical Instrument

Figure 1:
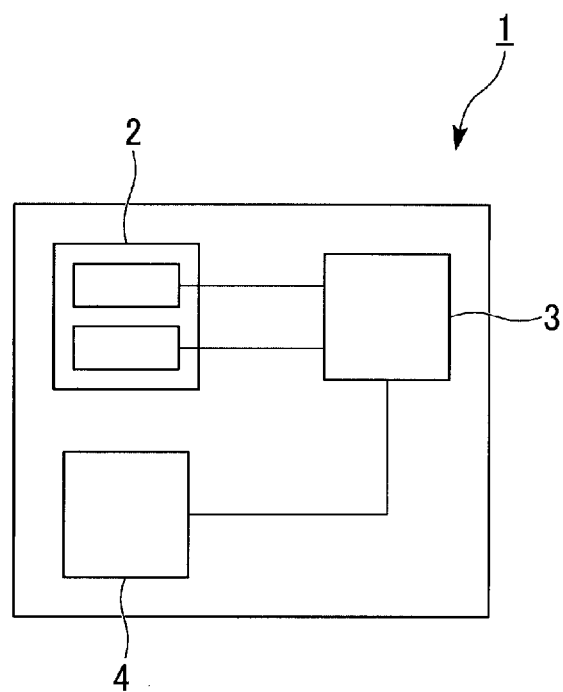
FIG. 1 is a block diagram of an optical instrument according to an embodiment of the invention.

FIG. 1 is a block diagram of an optical instrument 1.

As illustrated in FIG. 1, for example, the optical instrument 1 is used as a mirrorless single lens camera or a digital single lens reflex camera. The optical instrument 1 includes an FP shutter (blade drive device) 2, a control unit 3, and an imaging element 4.

The control unit 3 controls an overall operation of the optical instrument 1. For example, the control unit 3 includes a CPU, a ROM, and a RAM.

For example, the imaging element 4 is a CCD or a CMOS image sensor. The imaging element 4 converts an object image formed by light into an electric signal.

The optical instrument 1 includes a lens (not illustrated) for adjusting a focal length.

FP Shutter

Figure 2:
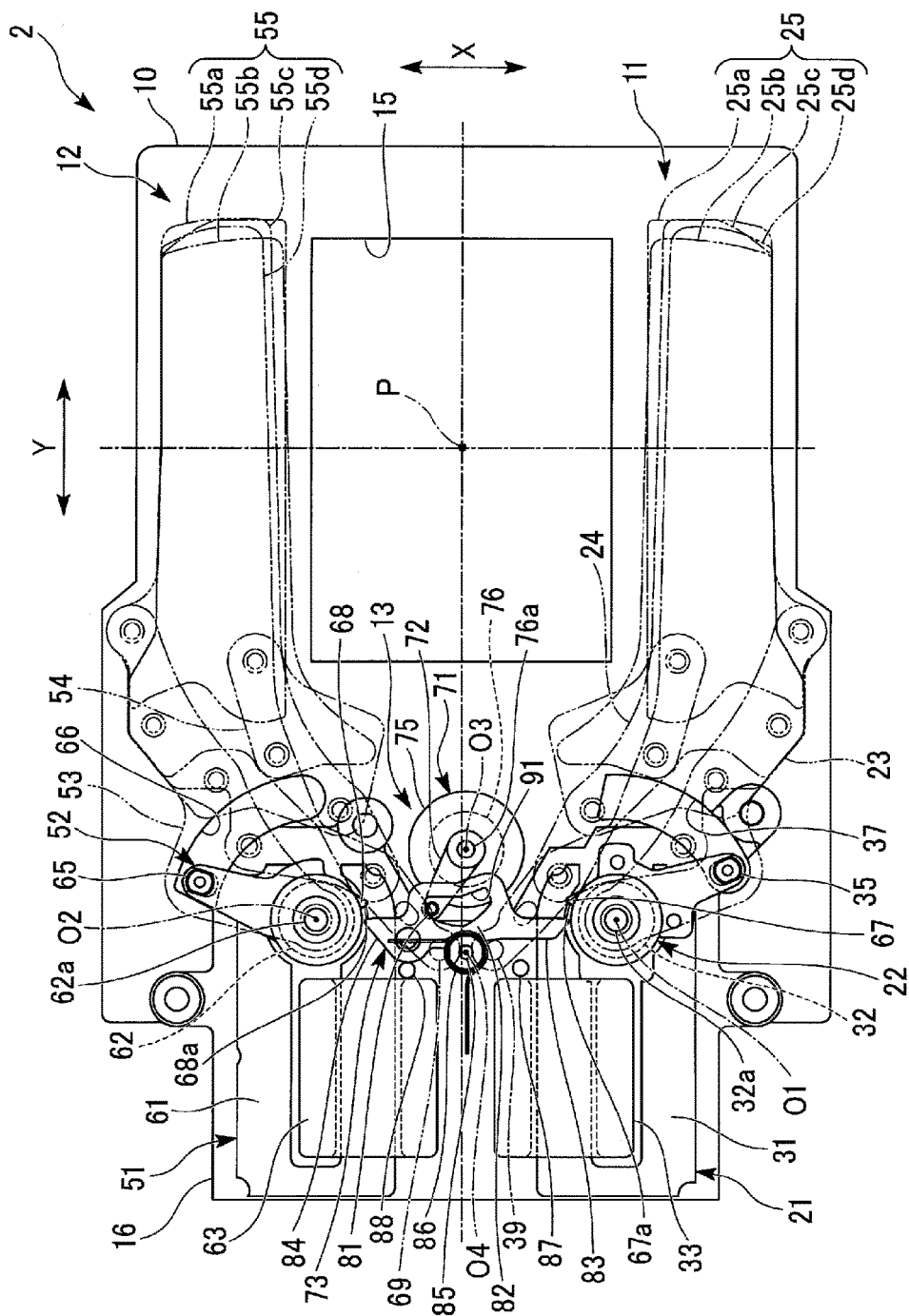
FIG. 2 is a plan view illustrating a state where a blade position holding mechanism is located at an entry position in an FP shutter according to the embodiment.

FIG. 2 is a plan view illustrating a state where a blade position holding mechanism 13 is located at an entry position in the FP shutter 2.

As illustrated in FIG. 2, the FP shutter 2 mainly has a substrate 10, a front curtain mechanism 11, a rear curtain mechanism 12, and the blade position holding mechanism 13.

The substrate 10 has an opening 15 into which the substrate 10 penetrates in a direction of an optical axis P. In the substrate 10, a sector region is defined between the substrate 10 and a blade receiving plate (not illustrated) disposed on one side in the direction of the optical axis P from the substrate 10. The blade receiving plate has an opening (not illustrated) having the same shape as the opening 15 in a plan view when viewed in the direction of the optical axis P. In the substrate 10, a drive region is defined between the substrate 10 and a drive receiving plate 16 disposed on the other side in the direction of the optical axis P from the substrate 10. In the drawing, members disposed in the sector region are indicated by a two-dot chain line, and members disposed in the drive region are indicated by a solid line or a broken line.

Front Curtain Mechanism

The front curtain mechanism 11 opens and closes the opening 15 by causing a so-called parallel link to convert pivoting movement around a front curtain axis O1 extending along the direction of the optical axis P into slide movement in a direction orthogonal to the optical axis P (X-direction illustrated in FIG. 2). Specifically, the front curtain mechanism 11 has a front curtain electromagnetic actuator 21, a front curtain drive lever 22, front curtain arms (first front curtain arm 23 and second front curtain arm 24), and a front curtain 25. In the front curtain mechanism 11, the front curtain electromagnetic actuator 21 and the front curtain drive lever 22 are disposed in the above-described drive region. On the other hand, the front curtain arms 23 and 24 and the front curtain 25 are disposed in the above-described sector region.

The front curtain electromagnetic actuator 21 has a front curtain stator 31 and a front curtain rotor 32.

The front curtain stator 31 is formed in a U-shape in a plan view. The front curtain stator 31 is equipped with a front curtain coil 33 for exciting the front curtain stator 31.

The front curtain rotor 32 is accommodated inside the front curtain stator 31. The front curtain rotor 32 is configured to be rotatable around the front curtain axis O1 extending along the direction of the optical axis P. A rotary shaft 32a of the front curtain rotor 32 faces the sector region after penetrating the substrate 10.

The front curtain drive lever 22 pivots around the front curtain axis O1 in response to the rotation of the front curtain rotor 32. Specifically, the front curtain drive lever 22 extends in a direction orthogonal to the direction of the optical axis P. A base end portion of the front curtain drive lever 22 is coupled to the rotary shaft 32a of the front curtain rotor 32.

A front curtain coupling pin 35 extending to one side in the direction of the optical axis P is disposed to protrude in a tip portion of the front curtain drive lever 22. The front curtain coupling pin 35 faces the sector region through a guide groove 37 formed in the substrate 10. The guide groove 37 is formed in an arc shape extending along a circumferential direction around the front curtain axis O1. That is, in response to the pivoting movement of the front curtain drive lever 22, the front curtain coupling pin 35 moves inside the guide groove 37. In this manner, a pivoting range of the front curtain drive lever 22 is regulated.

The first front curtain arm 23 extends in the direction orthogonal to the direction of the optical axis P. The base end portion of the first front curtain arm 23 is coupled to the front curtain coupling pin 35 and the rotary shaft 32a of the front curtain rotor 32 so as to be pivotally movable. That is, the first front curtain arm 23 is configured to be rotatable around the front curtain axis O1 in response to the rotation of the front curtain rotor 32.

The second front curtain arm 24 extends to follow the first front curtain arm 23 in the direction orthogonal to the direction of the optical axis P. The base end portion of the second front curtain arm 24 is supported so as to be pivotally movable around a support pin 39 protruding to one side in the direction of the optical axis P from the substrate 10.

The front curtain 25 has a plurality of (for example, four) blades 25a to 25d. The respective blades 25a to 25d extend in a direction (Y-direction in FIG. 2) orthogonal to an X-direction in a plan view. Each of the base end portions of the blades 25a to 25d is coupled to both the first front curtain arm 23 and the second front curtain arm 24 so as to be pivotally movable. In response to the drive of the front curtain electromagnetic actuator 21, the blades 25a to 25d are switched between an overlapped state where the blades 25a to 25d are overlapped with each other in a plan view and an expanded state (refer to FIG. 3) where the blades 25a to 25d are expanded in a plan view. In the overlapped state, the blades 25a to 25d escape from the opening 15 to one side in the X-direction, thereby bringing the front curtain 25 to an open position.

Figure 3:
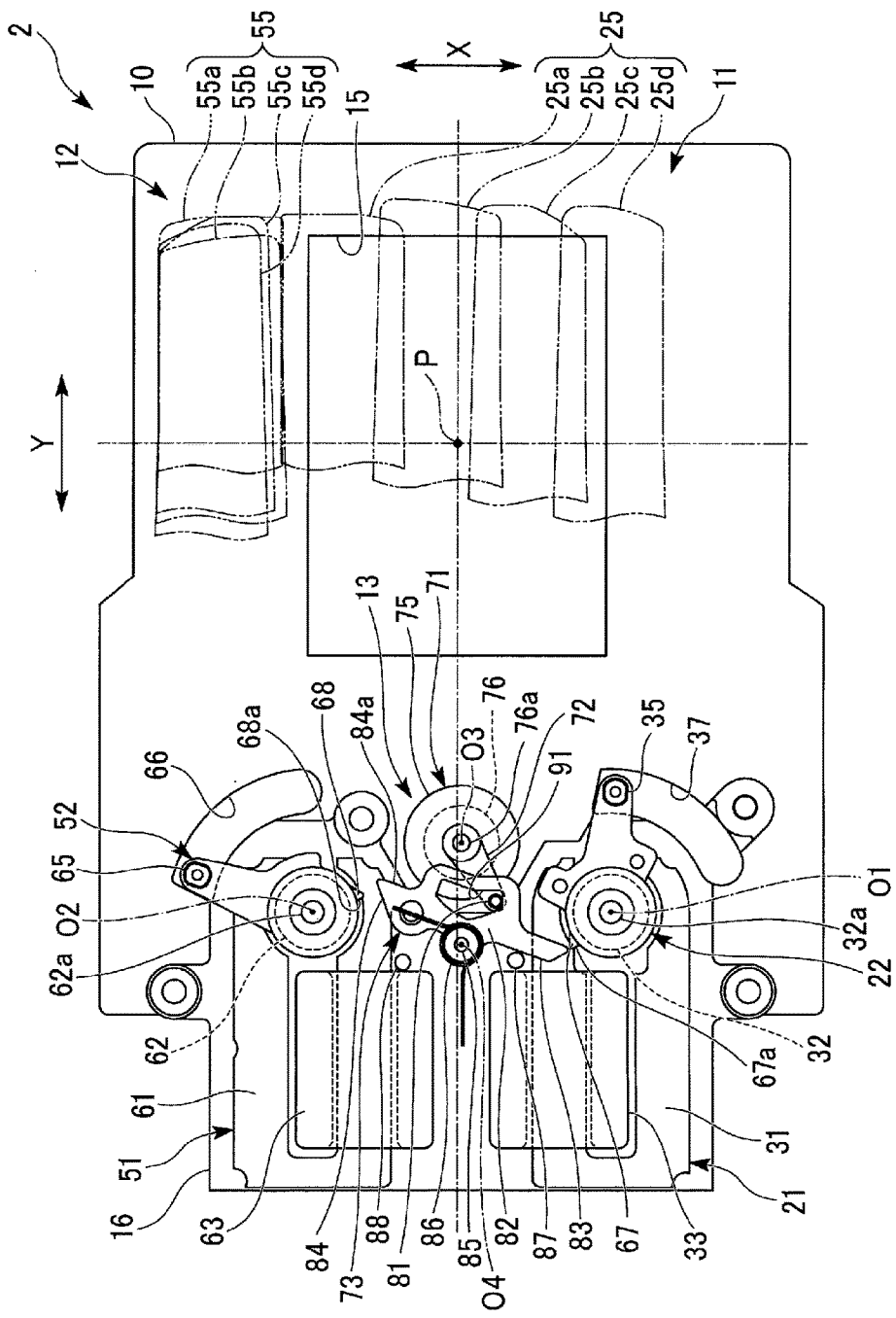
FIG. 3 is a plan view illustrating a state where a front curtain is located at a closed position in the FP shutter according to the embodiment.

FIG. 3 is a plan view illustrating a state where the front curtain 25 is located at a closed position in the FP shutter 2.

In the expanded state illustrated in FIG. 3, the blades 25a to 25d cover the opening 15 from one side in the direction of the optical axis P, thereby bringing the front curtain 25 to the closed position. The front curtain 25 is held without power supply at the open position and the closed position by a detent torque of the front curtain electromagnetic actuator 21. According to the present embodiment, when the power of the optical instrument 1 is turned off, the front curtain 25 is held without power supply at the open position by the detent torque.

Rear Curtain Mechanism

As illustrated in FIG. 2, the rear curtain mechanism 12 is disposed on the other side in the X-direction from the front curtain mechanism 11. Similarly to the front curtain mechanism 11, the rear curtain mechanism 12 opens and closes the opening 15 by causing the so-called parallel link to convert pivoting movement around a rear curtain axis O2 extending along the direction of the optical axis P into slide movement in the X-direction. The rear curtain mechanism 12 is formed so as to be plane-symmetrical to the front curtain mechanism 11 on a plane orthogonal to the X-direction. Therefore, hereinafter, a configuration which is the same as that of the front curtain mechanism 11 will be simply described.

The rear curtain mechanism 12 has a rear curtain electromagnetic actuator 51, a rear curtain drive lever 52, rear curtain arms (first rear curtain arm 53 and second rear curtain arm 54), and a rear curtain 55.

The rear curtain electromagnetic actuator 51 has a rear curtain stator 61 and a rear curtain rotor 62.

The rear curtain stator 61 is equipped with a rear curtain coil 63 for exciting the rear curtain stator 61.

The rear curtain rotor 62 is accommodated inside the rear curtain stator 61. The rear curtain rotor 62 is configured to be rotatable around the rear curtain axis O2 extending along the direction of the optical axis P. A rotary shaft 62a of the rear curtain rotor 62 faces the sector region after penetrating the substrate 10.

The rear curtain drive lever 52 is coupled to the rear curtain rotor 62, and pivots around the rear curtain axis O2 in response to the rotation of the rear curtain rotor 62. A rear curtain coupling pin 65 extending to one side in the direction of the optical axis P is disposed to protrude in the tip portion of the rear curtain drive lever 52. The rear curtain coupling pin 65 faces the sector region through a guide groove 66 formed in the substrate 10.

In the first rear curtain arm 53, the base end portion is coupled to the rear curtain coupling pin 65 and the rotary shaft 62a of the rear curtain rotor 62.

In the second rear curtain arm 54, the base end portion is supported so as to be pivotally movable around a support pin 69 protruding to one side in the direction of the optical axis P from the substrate 10.

The rear curtain 55 has a plurality of (for example, four) blades 55a to 55d. Each of the base end portions of the blades 55a to 55d is coupled to both the first rear curtain arm 53 and the second rear curtain arm 54 so as to be pivotally movable. In response to the drive of the rear curtain electromagnetic actuator 51, the blades 55a to 55d are switched between the overlapped state where the blades 55a to 55d are overlapped with each other in a plan view and the expanded state (refer to FIG. 4) where the blades 55a to 55d are expanded in a plan view. In the overlapped state, the blades 55a to 55d escape from the opening 15 to the other side in the X-direction, thereby bringing the rear curtain 55 to the open position.

Figure 4:
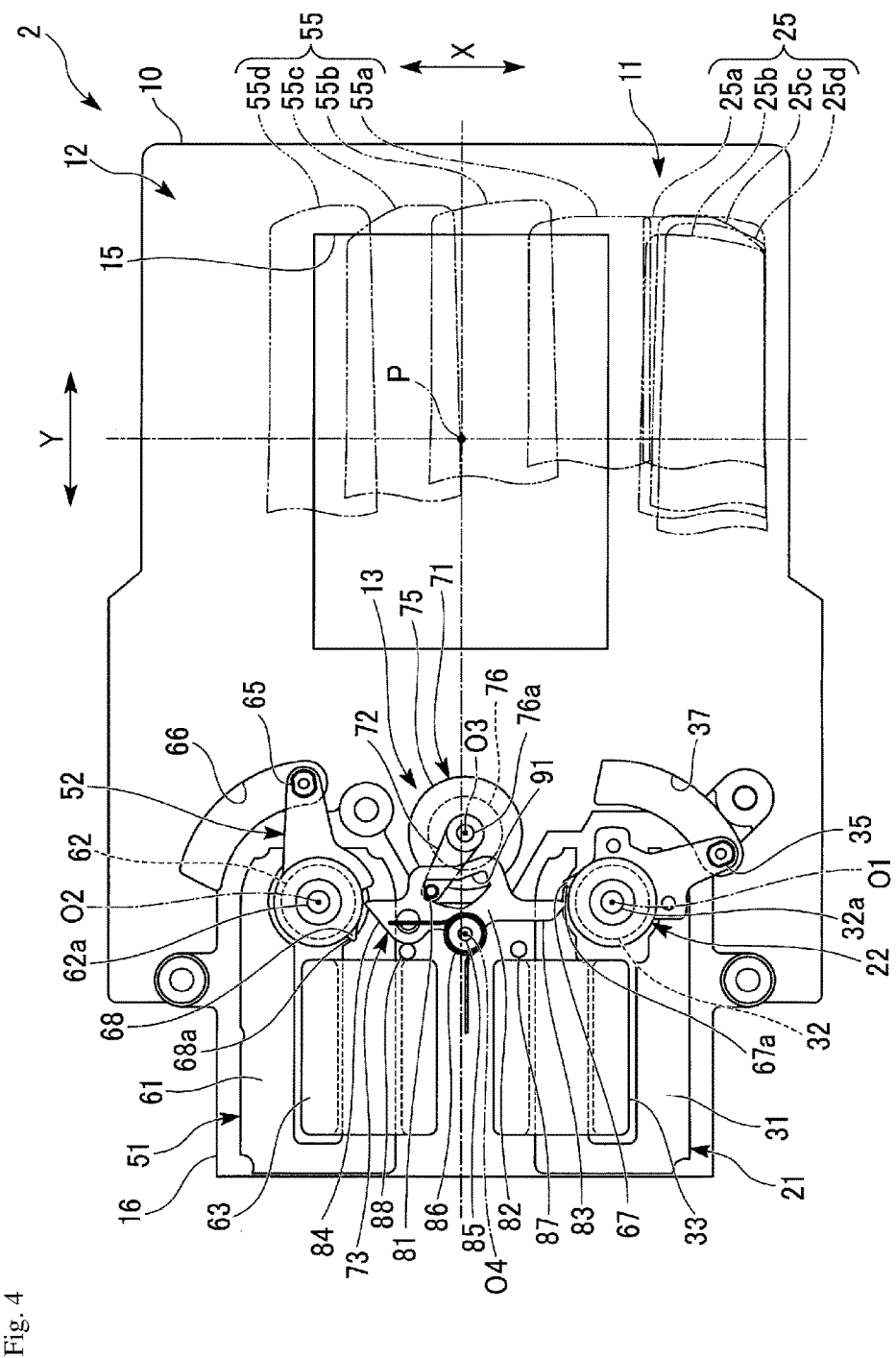
FIG. 4 is a plan view illustrating a state where a rear curtain is located at the closed position in the FP shutter according to the embodiment.

FIG. 4 is a plan view illustrating a state where the rear curtain 55 is located at the closed position in the FP shutter 2.

In the expanded state illustrated in FIG. 4, the respective blades 55a to 55d cover the opening 15 from one side in the direction of the optical axis P, thereby bringing the rear curtain 55 to the closed position. The rear curtain 55 is held without power supply at the open position and the closed position by the detent torque of the rear curtain electromagnetic actuator 51. According to the present embodiment, when the power of the optical instrument 1 is turned off, the rear curtain 55 is held without power supply at the open position by the detent torque. The number of the blades 25a to 25d and 55a to 55d of the front curtain 25 and the rear curtain 55 is not limited to four, and can be appropriately changed.

Here, as illustrated in FIG. 2, in the base end portion of the front curtain drive lever 22 and the rear curtain drive lever 52, a front curtain locking portion 67 and a rear curtain locking portion 68 are integrally formed in the front curtain drive lever 22 and the rear curtain drive lever 52, respectively.

The front curtain locking portion 67 protrudes to the other side in the X-direction from the base end portion of the front curtain drive lever 22. The front curtain locking portion 67 is formed in a triangular shape in a plan view. Specifically, in the front curtain locking portion 67, in the circumferential direction around the front curtain axis O1, a surface (hereinafter, referred to as a "locking surface 67a") facing in the closing direction of the front curtain drive lever 22 is formed to be a flat surface extending along the radial direction of the front curtain axis O1. On the other hand, in the front curtain locking portion 67, in the circumferential direction around the front curtain axis O1, a surface facing in the opening direction of the front curtain drive lever 22 is formed to be a tilting surface whose protruding amount in the radial direction of the front curtain axis O1 gradually decreases in the opening direction.

The rear curtain locking portion 68 protrudes to one side in the X-direction from the base end portion of the rear curtain drive lever 52. The rear curtain locking portion 68 is formed in a triangular shape in a plan view. Specifically, in the rear curtain locking portion 68, in the circumferential direction around the rear curtain axis O2, a surface (hereinafter, referred to as a "locking surface 68a") facing in the closing direction of the rear curtain drive lever 52 is formed to be a flat surface extending along the radial direction of the rear curtain axis O2. On the other hand, in the rear curtain locking portion 68, in the circumferential direction around the rear curtain axis O2, a surface facing in the opening direction is formed to be a tilting surface whose protruding amount in the radial direction of the rear curtain axis O2 gradually decreases in the opening direction. The front curtain locking portion 67 and the rear curtain locking portion 68 may be formed separately from the front curtain drive lever 22 and the rear curtain drive lever 52, respectively.

Blade Position Holding Mechanism

The blade position holding mechanism 13 is disposed between the front curtain mechanism 11 and the rear curtain mechanism 12 in the X-direction. For example, when the power of the optical instrument 1 is turned off, the blade position holding mechanism 13 regulates the movement of the front curtain mechanism 11 and the rear curtain mechanism 12 in the closing direction. Specifically, the blade position holding mechanism 13 mainly has a regulation electromagnetic actuator 71, a linkage lever 72, and a regulation lever 73. The blade position holding mechanism 13 is disposed in the above-described drive region.

Figure 5:
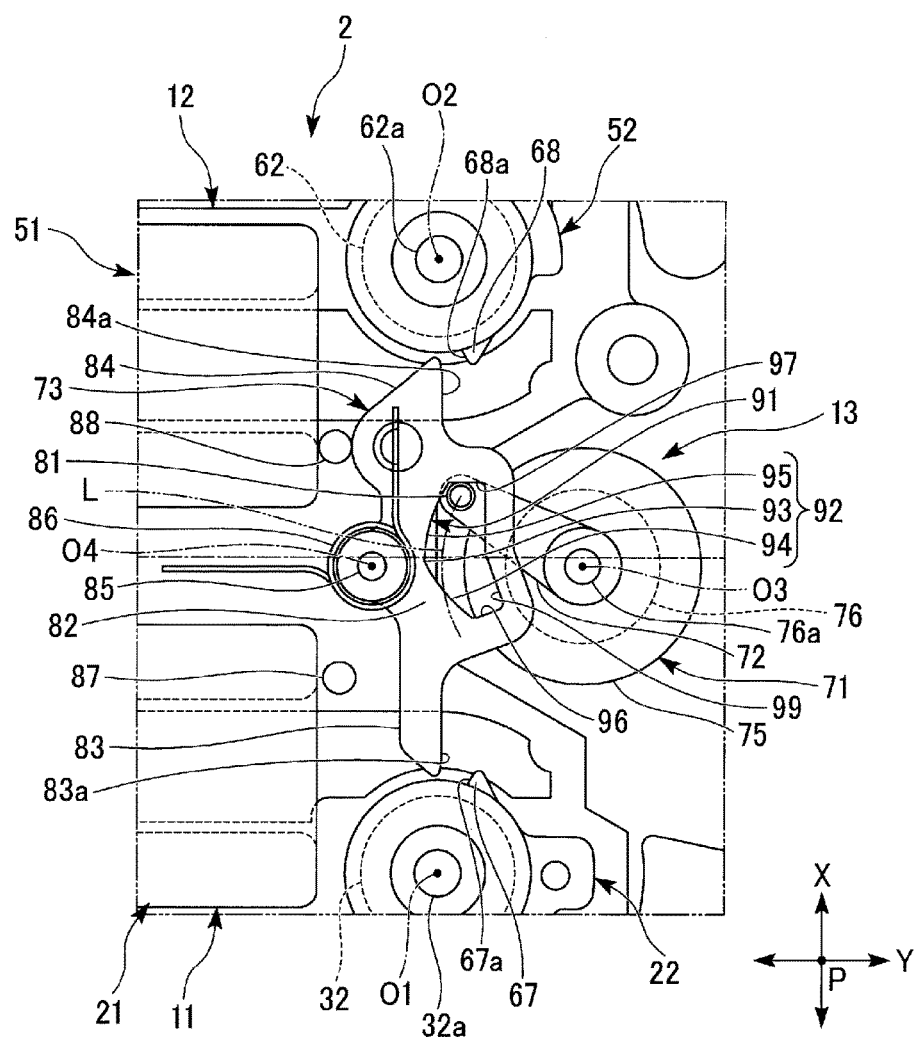
FIG. 5 is an enlarged plan view illustrating a state where the blade position holding mechanism is located at the entry position in the FP shutter according to the embodiment.

FIG. 5 is an enlarged plan view illustrating a state where the blade position holding mechanism 13 is located at the entry position in the FP shutter 2.

As illustrated in FIG. 5, the regulation electromagnetic actuator 71 has a regulation stator 75 and a regulation rotor 76.

The regulation stator 75 is formed in a cylindrical shape extending in the direction of the optical axis P. The regulation stator 75 is equipped with a regulation coil (not illustrated) for exciting the regulation stator 75.

The regulation rotor 76 is accommodated inside the regulation stator 75. The regulation rotor 76 is configured to be rotatable around a regulation axis O3 extending along the direction of the optical axis P. An output of the regulation electromagnetic actuator 71 is smaller than each output of the front curtain electromagnetic actuator 21 and the rear curtain electromagnetic actuator 51. However, each output of the respective actuators 21, 51, and 71 can be appropriately changed.

The linkage lever 72 pivots around the regulation axis O3 in response to the rotation of the regulation rotor 76. Specifically, the linkage lever 72 extends toward one side in the Y-direction (direction away from the regulation axis O3 in the radial direction of the regulation axis O3) in the direction orthogonal to the optical axis P. The base end portion of the linkage lever 72 is coupled to a rotary shaft 76a of the regulation rotor 76. A linkage pin 81 extending to one side in the direction of the optical axis P is disposed to protrude in the tip portion of the linkage lever 72.

The regulation lever 73 is disposed on one side in the Y-direction from the regulation electromagnetic actuator 71. The regulation lever 73 includes a base portion 82, a front curtain regulation portion 83, and a rear curtain regulation portion 84.

The base portion 82 is supported by a support pin 85 protruding to the other side in the direction of the optical axis P from the substrate 10 so as to be pivotally movable around a lever axis O4 extending along the direction of the optical axis P. In the present embodiment, the front curtain mechanism 11 and the rear curtain mechanism 12 are disposed at positions which are line-symmetrical to a symmetry line extending in the Y-direction through the lever axis O4 in a plan view. Each position of the front curtain mechanism 11 and the rear curtain mechanism 12 can be appropriately changed. For example, both of these may be disposed at positions which are line-symmetrical to a symmetry line extending in the Y-direction through the regulation axis O3 in a plane view.

The front curtain regulation portion 83 protrudes toward one side in the X-direction from the base portion 82. In response to the pivoting movement of the regulation lever 73, the front curtain regulation portion 83 moves between the entry position (refer to FIG. 5) where the front curtain regulation portion 83 enters the operation trajectory of the front curtain locking portion 67 and an escape position (refer to FIG. 6) where the front curtain regulation portion 83 escapes from the operation trajectory of the front curtain locking portion 67. Specifically, at the entry position, the front curtain regulation portion 83 faces the front curtain locking portion 67 in the closing direction of the front curtain drive lever 22. In the front curtain regulation portion 83, a surface (hereinafter, referred to as a "regulation surface 83a") facing the entry position in the circumferential direction around the lever axis O4 is formed to be a flat surface which can come into contact with the locking surface 67a of the front curtain locking portion 67. That is, at the entry position of the regulation lever 73, the front curtain regulation portion 83 regulates the movement of the front curtain 25 in the closing direction by the front curtain locking portion 67 of the front curtain mechanism 11 (front curtain drive lever 22) coming into contact with the front curtain regulation portion 83. The front curtain regulation portion 83 is configured to come into contact with the front curtain locking portion 67 before the front curtain 25 approaches the opening 15 in a plan view (open region where the front curtain 25 escapes from the opening 15 in a plan view).

In the front curtain regulation portion 83, a surface facing the escape position in the circumferential direction around the lever axis O4 is formed to be a tilting surface in which the width of the front curtain regulation portion 83 gradually becomes narrower in a direction toward the tip portion of the front curtain regulation portion 83.

Figure 6:
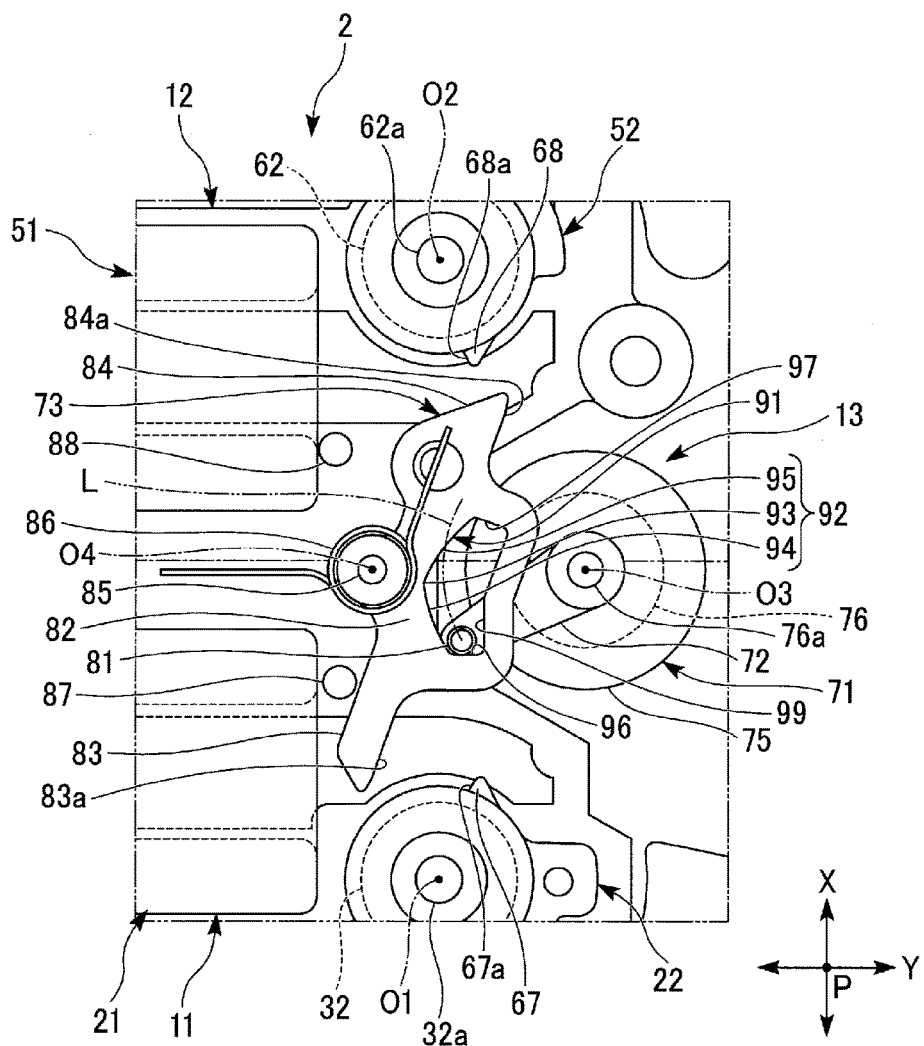
FIG. 6 is an enlarged plan view illustrating a state where the blade position holding mechanism is located at an escape position in the FP shutter according to the embodiment.

FIG. 6 is an enlarged plan view illustrating a state where the blade position holding mechanism 13 is located at the escape position in the FP shutter 2.

As illustrated in FIG. 6, at the escape position, the front curtain regulation portion 83 is located on the other side in the X-direction from the operation trajectory of the front curtain locking portion 67. That is, at the escape position of the regulation lever 73, the front curtain regulation portion 83 allows the front curtain mechanism 11 (front curtain drive lever 22) to move in the closing direction.

As illustrated in FIG. 5, the rear curtain regulation portion 84 protrudes toward the other side in the X-direction from the base portion 82. In response to the pivoting movement of the regulation lever 73, the rear curtain regulation portion 84 moves between the entry position (refer to FIG. 5) where the rear curtain regulation portion 84 enters the operation trajectory of the rear curtain locking portion 68 and the escape position (refer to FIG. 6) where the rear curtain regulation portion 84 escapes from the operation trajectory of the rear curtain locking portion 68. Specifically, at the entry position, the rear curtain regulation portion 84 faces the rear curtain locking portion 68 in the closing direction of the rear curtain drive lever 52. In the rear curtain regulation portion 84, a surface (hereinafter, referred to as a "regulation surface 84a") facing the escape position in the circumferential direction around the lever axis O4 is formed to be a flat surface which can come into contact with the locking surface 68a of the rear curtain locking portion 68. That is, at the entry position of the regulation lever 73, the rear curtain regulation portion 84 regulates the movement of the rear curtain 55 in the closing direction by the rear curtain locking portion 68 of the rear curtain mechanism 12 (rear curtain drive lever 52) coming into contact with the rear curtain regulation portion 84. The rear curtain regulation portion 84 is configured to come into contact with the rear curtain locking portion 68 before the rear curtain 55 approaches the opening 15 in a plan view (open region where the rear curtain 55 escapes from the opening 15 in a plan view).

In the rear curtain regulation portion 84, a surface facing the entry position in the circumferential direction around the lever axis O4 is formed to be a tilting surface in which the width of the rear curtain regulation portion 84 gradually becomes narrower in a direction toward the tip portion of the rear curtain regulation portion 84.

As illustrated in FIG. 6, at the escape position, the rear curtain regulation portion 84 is located on one side in the X-direction from the operation trajectory of the rear curtain locking portion 68. That is, at the escape position of the regulation lever 73, the rear curtain regulation portion 84 allows the rear curtain mechanism 12 (rear curtain drive lever 52) to move in the closing direction. The regulation lever 73 is held without power supply at each of the entry position and the escape position by the detent torque of the regulation electromagnetic actuator 71. According to the present embodiment, when the power of the optical instrument 1 is turned off, the regulation lever 73 is held without power supply at the entry position by the detent torque.

A biasing member 86 for biasing the regulation lever 73 toward the escape position (one side in the circumferential direction around the lever axis O4) is interposed between the substrate 10 and the regulation lever 73.

A first regulation pin 87 and a second regulation pin 88 which specify a pivoting range of the regulation lever 73 are disposed in the substrate 10. The first regulation pin 87 is configured so that the front curtain regulation portion 83 can come into contact with the first regulation pin 87 from one side in the circumferential direction around the lever axis O4. The first regulation pin 87 regulates the movement of the regulation lever 73 pivoting to one side in the circumferential direction around the lever axis O4, and aligns the regulation lever 73 with the escape position.

The second regulation pin 88 is configured so that the rear curtain regulation portion 84 can come into contact with the second regulation pin 88 from the other side in the circumferential direction around the lever axis O4. The second regulation pin 88 regulates the movement of the regulation lever 73 pivoting to the other side in the circumferential direction around the lever axis O4, and aligns the regulation lever 73 with the entry position. As long as a configuration for specifying the pivoting range of the regulation lever 73 is adopted, the respective regulation pins 87 and 88 do not necessarily need to come into contact with the front curtain regulation portion 83 or the rear curtain regulation portion 84.

As illustrated in FIG. 5, the base portion 82 has a guide hole 91 into which the linkage pin 81 is loosely inserted. The guide hole 91 is an arc-shaped long hole extending along the circumferential direction around the regulation axis O3. Specifically, on the inner peripheral surface of the guide hole 91, a surface located on one side in the Y-direction from the linkage pin 81 configures a guide surface 92 having a V-shape in a plan view. On the guide surface 92, a central portion in the circumferential direction around the regulation axis O3 configures an escape portion 93 escaped to one side in the Y-direction from a pivoting trajectory L of the linkage pin 81 in response to the pivoting movement of the linkage lever 72. On the other hand, on the guide surface 92, portions connected to both sides of the escape portion 93 in the circumferential direction around the regulation axis O3 configure a first sliding contact portion 94 and a second sliding contact portion 95 with which the linkage pin 81 comes into sliding contact when the linkage lever 72 pivots. The sliding contact portions 94 and 95 extend to the other side in the Y-direction (direction closer to the regulation axis O3 in the radial direction of the regulation axis O3) as both of these are separated from the escape portion 93 in the circumferential direction around the regulation axis O3.

On the inner peripheral surface of the guide hole 91, a portion connected to the first sliding contact portion 94 on one side in the circumferential direction around the regulation axis O3 configures a first contact portion 96 facing the linkage pin 81 in the circumferential direction around the regulation axis O3. The first contact portion 96 extends to the other side in the Y-direction from the first sliding contact portion 94.

On the inner peripheral surface of the guide hole 91, a portion connected to the second sliding contact portion 95 on the other side in the circumferential direction around the regulation axis O3 configures a second contact portion 97 facing the linkage pin 81 in the circumferential direction around the regulation axis O3. The second contact portion 97 extends to the other side in the Y-direction from the second sliding contact portion 95. In this way, the linkage pin 81 is disposed inside the guide hole 91 while being provided with play in the circumferential direction (pivoting direction of the linkage lever 72) around the regulation axis O3. Therefore, inside the guide hole 91 according to the present embodiment, clearances between the linkage pin 81 and the sliding contact portions 94 and 95, and the contact portions 96 and 97 in the circumferential direction around the regulation axis O3 configure idle running regions where the linkage pin 81 runs idle with respect to the regulation lever 73 in response to the pivoting movement around the regulation axis O3 of the linkage lever 72. On the inner peripheral surface of the guide hole 91, a surface located on the other side in the Y-direction from the linkage pin 81 configures an escape portion 99 separated to the other side in the Y-direction from the linkage pin 81.

Operation

Next, an operation according to the present embodiment will be described. Hereinafter, an actuating operation, a stopping operation, and a shutter operation of the optical instrument 1, and an operation when an impact is input to the optical instrument 1 will be described. In the following description, a state where power is turned off as illustrated in FIG. 2 is referred to as an initial state. That is, when the power is turned off, both the front curtain 25 and the rear curtain 55 are held without power supply at the open position by the detent torque of the respective electromagnetic actuators 21 and 51. When the power is turned off, the regulation lever 73 is held without power supply at the entry position by the detent torque.

Actuating Operation and Stopping Operation

As illustrated in FIGS. 2 and 5, during the actuating operation, in a state where the power of the optical instrument 1 is turned off, a user presses a power supply button (not illustrated) of the optical instrument 1. Then, the power is supplied to a regulation coil (not illustrated) of the regulation electromagnetic actuator 71, thereby causing the regulation rotor 76 to rotate to one side around the regulation axis O3 (counterclockwise). When the linkage lever 72 pivots to one side around the regulation axis O3 in response to the rotation of the regulation rotor 76, the linkage pin 81 moves to one side around the regulation axis O3 inside the guide hole 91. Then, the linkage pin 81 is separated from the second sliding contact portion 95 and the second contact portion 97, and the linkage pin 81 runs idle inside the guide hole 91 toward the first sliding contact portion 94 and the first contact portion 96.

Figure 7:
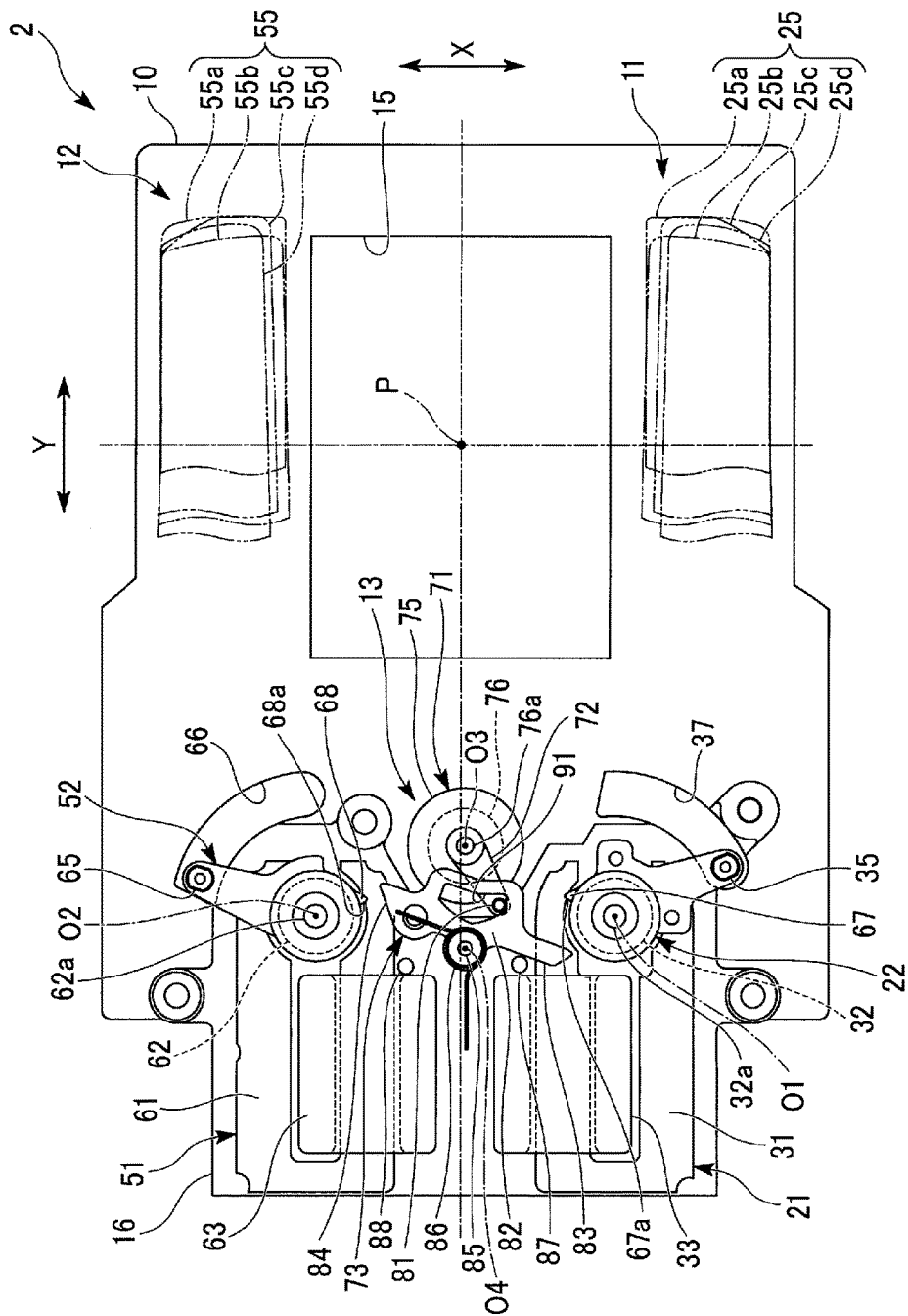
FIG. 7 is a plan view illustrating a state where the blade position holding mechanism is located at the escape position in the FP shutter according to the embodiment.

FIG. 7 is a plan view illustrating a state where the blade position holding mechanism 13 is located at the escape position in the FP shutter 2.

As illustrated in FIGS. 6 and 7, when the linkage pin 81 is separated from the second sliding contact portion 95 and the second contact portion 97, the regulation lever 73 pivots toward the escape position and toward one side around the lever axis O4 due to a biasing force of the biasing member 86. Thereafter, the regulation lever 73 (front curtain regulation portion 83) comes into contact with the first regulation pin 87 from one side in the circumferential direction around the lever axis O4, thereby stopping the pivoting movement of the regulation lever 73.

In this manner, the regulation lever 73 is brought to the escape position illustrated in FIG. 7. At the escape position, the front curtain mechanism 11 and the rear curtain mechanism 12 are allowed to move in the closing direction (shutter operation).

While the regulation lever 73 moves to the escape position, the linkage pin 81 passes through the escape portion 93. Thereafter, the linkage pin 81 pivots together with the regulation lever 73 while coming into sliding contact with the first sliding contact portion 94. Then, when the regulation lever 73 is located at the escape position, the biasing force of the biasing member 86 brings the linkage pin 81 into contact with the first sliding contact portion 94 of the guide hole 91 and the first contact portion 96, thereby regulating the movement of the regulation lever 73 to the entry position.

In the stopping operation, in a state where the power of the optical instrument 1 is turned on, the user presses the power supply button of the optical instrument 1. Then, the regulation rotor 76 is rotated to the other side around the regulation axis O3 (clockwise), thereby causing the linkage lever 72 to pivot to the other side around the regulation axis O3. At this time, the linkage pin 81 moves to the other side around the regulation axis O3 inside the guide hole 91. In this manner, the linkage pin 81 is separated from the first sliding contact portion 94 and the first contact portion 96, and the linkage pin 81 runs idle inside the guide hole 91 toward the second sliding contact portion 95 and the second contact portion 97.

Thereafter, the linkage pin 81 comes into sliding contact with the second sliding contact portion 95 after passing through the escape portion 93 of the guide hole 91, thereby causing the regulation lever 73 to pivot together with the linkage lever 72. At this time, against the biasing force of the biasing member 86, the regulation lever 73 pivots around the lever axis O4 toward the entry position. Thereafter, the regulation lever 73 (rear curtain regulation portion 84) comes into contact with the second regulation pin 88 from the other side in the circumferential direction around the lever axis O4, thereby stopping the pivoting movement of the regulation lever 73. Then, when the regulation lever 73 stops at the entry position, the linkage pin 81 comes into contact with the second sliding contact portion 95 of the guide hole 91 and the second contact portion 97, thereby regulating the movement of the regulation lever 73 to the escape position.

Shutter Operation

When an image is captured, in a state where the power of the optical instrument 1 is turned on, if the user presses a release button (not illustrated), the front curtain 25 moves toward the closed position. Specifically, the power is supplied to the front curtain coil 33 of the front curtain electromagnetic actuator 21, thereby causing the front curtain rotor 32 to rotate to one side around the front curtain axis O1 (counterclockwise). In this manner, as illustrated in FIG. 3, the front curtain 25 slides and moves in the closing direction (the other side in the X-direction), thereby bringing the respective blades 25*a* to 25*d* into a deployed state. As a result, the front curtain 25 is brought to the closed position, and the opening 15 is closed by the front curtain 25.

Figure 8:
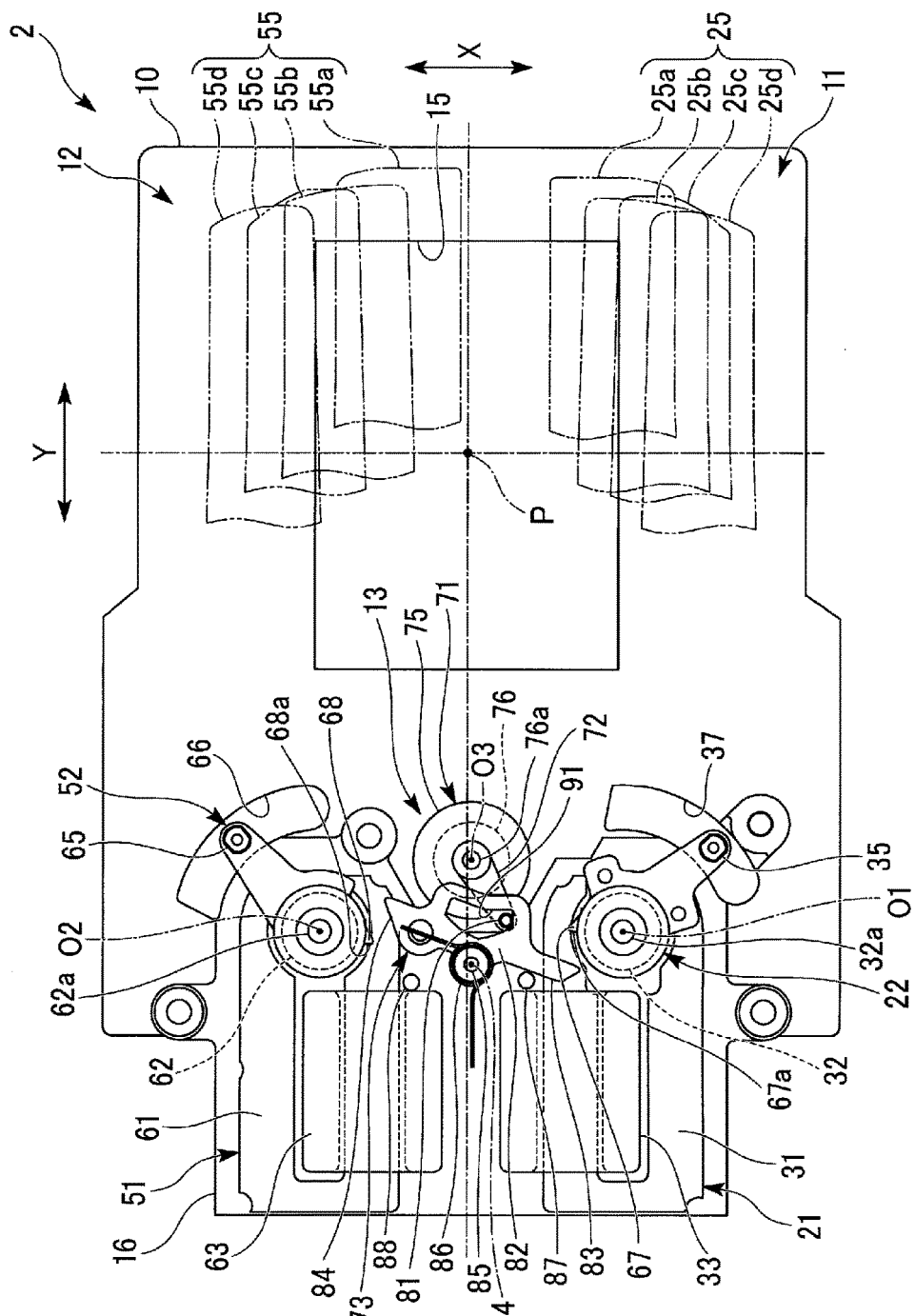
FIG. 8 is a plan view illustrating an exposure operation in the FP shutter according to the embodiment.

FIG. 8 is a plan view illustrating an exposure operation in the FP shutter 2.

Subsequently, the exposure operation illustrated in FIG. 8 is performed. Specifically, a power supply direction of the front curtain coil 33 is switched, thereby causing the front curtain rotor 32 to rotate to the other side around the front curtain axis O1 (clockwise). Then, the front curtain 25 slides and moves in the opening direction (one side in the X-direction). After a predetermined time elapses after the front curtain 25 starts to move, the rear curtain 55 is moved toward the closed position. Specifically, similarly to the operation method of the front curtain 25, the power is supplied to the rear curtain coil 63 of the rear curtain electromagnetic actuator 51, thereby causing the rear curtain rotor 62 to rotate to one side around the rear curtain axis O2 (clockwise). In this manner, in a state where a clearance is generated between the front curtain 25 and the rear curtain 55, the rear curtain 55 slides and moves in the closing direction (one side in the X-direction). At this time, light passes through the clearance between the front curtain 25 and the rear curtain 55, thereby exposing the imaging element 4. Then, the front curtain 25 is brought to the open position, and the rear curtain 55 is brought to the closed position, thereby completing the exposure operation.

After the exposure operation is completed, the power supply direction of the rear curtain coil 63 is switched, thereby causing the rear curtain rotor 62 to rotate to the other side around the rear curtain axis O2 (counterclockwise). Then, the rear curtain 55 slides and moves in the other side in the X-direction, thereby causing the rear curtain 55 to return to the open position.

According to above-described configuration, the shutter operation is completed.

When Impact is Input

Subsequently, description will be made on an operation of the FP shutter 2 in a case where an impact load is input to the optical instrument 1 due to dropping in a state where the power of the optical instrument 1 is turned off. Hereinafter, as an example, a case will be described where the optical instrument 1 drops in a state where the front curtain 25 faces downward.

First, as illustrated in FIG. 2, in a state where the power of the optical instrument 1 is turned off, both the front curtain 25 and the rear curtain 55 are located at the open position, and the regulation lever 73 of the blade position holding mechanism 13 is located at the entry position. In this state, if the impact load is input to the optical instrument 1, the front curtain 25 tends to be unexpectedly slid and moved in the closing direction (the other side in the X-direction). Then, in response to the slide movement of the front curtain 25, the front curtain rotor 32 and the front curtain drive lever 22 tend to pivot toward one side around the front curtain axis O1.

Then, as illustrated in FIG. 5, the front curtain locking portion 67 (locking surface 67*a*) of the front curtain drive lever 22 comes into contact with the front curtain regulation portion 83 (regulation surface 83*a*) from the other side around the front curtain axis O1. In this manner, the pivoting movement of the front curtain drive lever 22 to one side around the front curtain axis O1 is regulated, thereby regulating the slide movement of the front curtain 25 in the closing direction.

If the impact load is input to the optical instrument 1, due to the inertia, the rear curtain 55 tends to be unexpectedly slid and moved in the closing direction (one side in the X-direction). Then, in response to the slide movement of the rear curtain 55, the rear curtain rotor 62 and the rear curtain drive lever 52 tend to pivot toward one side around the rear curtain axis O2. Then, the rear curtain locking portion 68 (locking surface 68*a*) of the rear curtain drive lever 52 comes into contact with the rear curtain regulation portion 84 (regulation surface 84*a*) from the other side around the rear curtain axis O2. In this manner, the pivoting movement of the rear curtain drive lever 52 to one side around the rear curtain axis O2 is regulated, thereby regulating the slide movement of the rear curtain 55 in the closing direction. As a result, it is possible to restrain the front curtain 25 and the rear curtain 55 from entering the opening 15 in a plan view. After the slide movement of the front curtain 25 and the rear curtain 55 in the X-direction is regulated by the blade position holding mechanism 13, the front curtain 25 and the rear curtain 55 are caused to return to the initial state by the detent torque of the respective electromagnetic actuators 21 and 51.

Here, since the electromagnetic actuators 21 and 51 rotate in mutually opposite directions, the front curtain 25 and the rear curtain 55 respectively slide and move in the closing direction. In this case, when the above-described impact load is input, the front curtain 25 (front curtain locking portion 67) comes into contact with the front curtain regulation portion 83 from the other side in the circumferential direction around the lever axis O4. Accordingly, the regulation lever 73 tends to pivot to one side around the lever axis O4. The rear curtain 55 (rear curtain locking portion 68) comes into contact with the rear curtain regulation portion 84 from one side in the circumferential direction around the lever axis O4. Accordingly, the regulation lever 73 tends to pivot to the other side around the lever axis O4. Therefore, the pivoting operation of the regulation lever 73 toward the escape position, which is performed by the front curtain locking portion 67 coming into contact with the front curtain regulation portion 83, is cancelled by the pivoting operation of the regulation lever 73 toward the entry position, which is performed by the rear curtain locking portion 68 coming into contact with the rear curtain regulation portion 84. Therefore, the regulation lever 73 can maintain the entry position easily.

For example, in a case where the impact load input to the optical instrument 1 is small, only the front curtain 25 tends to move in the closing direction in some cases. In this case, it is difficult to think that the impact load is input to such an extent as to move the regulation lever 73 to the escape position. Therefore, even if the regulation lever 73 tends to pivot toward the escape position, the regulation lever 73 stays at the entry position due to the detent torque of the regulation electromagnetic actuator 71.

In this way, the present embodiment adopts a configuration in which the linkage pin 81 of the linkage lever 72 is loosely inserted into the guide hole 91 of the regulation lever 73 (engagement with play).

According to this configuration, when the linkage lever 72 pivots, the linkage pin 81 runs idle inside the guide hole 91 until the linkage pin 81 comes into contact with the sliding contact portions 94 and 95, and the contact portions 96 and 97. Therefore, it is possible to reduce a load torque applied to the regulation electromagnetic actuator 71. In this manner, miniaturization of the regulation electromagnetic actuator 71 can be achieved, and less power consumption of the FP shutter 2 can be achieved. According to the present embodiment, the linkage pin 81 is inserted loosely into the guide hole 91. Accordingly, compared with a case where the linkage lever 72 is interlocked with the rotation operation of the regulation electromagnetic actuator 71, it is possible to minimize the pivoting range of the regulation lever 73 with respect to an actuation angle of the regulation electromagnetic actuator 71. In this manner, the regulation electromagnetic actuator 71 can be more freely selected, and the regulation lever 73 can easily be set in a desired pivoting range with respect to the actuation angle of the regulation electromagnetic actuator 71. In this regard, the FP shutter 2 can be more freely designed.

The present embodiment adopts a configuration in which at the entry position, the regulation lever 73 can be locked by both the front curtain locking portion 67 and the rear curtain locking portion 68 so as to regulate the movement of the front curtain 25 and the rear curtain 55 in the closing direction.

According to this configuration, it is possible to restrain the front curtain 25 and the rear curtain 55 from being unexpectedly moved in the closing direction due to a drop impact. In this manner, it is not necessary to increase the detent torque of the electromagnetic actuators 21 and 51 in order to hold the front curtain 25 and the rear curtain 55 at the open position. Therefore, a miniaturized device, a quickened shutter operation, and impact resistance can be realized.

According to the present embodiment, the guide hole 91 has the escape portion 93 which escapes from the contact with the linkage pin 81 in the Y-direction. Accordingly, it is possible to reliably reduce the load torque applied to the regulation electromagnetic actuator 71.

According to the present embodiment, the FP shutter 2 has the biasing member 86 that biases the regulation lever 73 toward the escape position. Accordingly, it is possible to restrain rattling of the regulation lever 73. Therefore, it is possible to restrain the shutter operation from being hindered by the regulation lever 73 after the regulation lever 73 unexpectedly enters the entry position.

According to the present embodiment, it is possible to reliably restrain the front curtain 25 and the rear curtain 55 from entering the inside of the opening 15 in a plan view. Therefore, for example, it is possible to reliably restrain the front curtain 25 or the rear curtain 55 from appearing on a monitor (not illustrated) of the optical instrument 1. In addition, it is possible to minimize a movement amount of the front curtain 25 and the rear curtain 55. Therefore, even in a case where the front curtain 25 and the rear curtain 55 are moved in the closing direction due to an impact load, the front curtain 25 and the rear curtain 55 are made to easily return to the initial state by the detent torque.

According to the present embodiment, the movement of the front curtain 25 and the rear curtain 55 in the closing direction can be regulated by the single blade position holding mechanism 13. Therefore, compared with a case where the blade position holding mechanism is disposed in each of the front curtain 25 and the rear curtain 55, the FP shutter 2 can be miniaturized.

The present embodiment adopts a configuration in which the front curtain 25 and the rear curtain 55 respectively have the plurality of blades 25a to 25d and 55a to 55d.

According to this configuration, the plurality of blades 25a to 25d and 55a to 55d are held at the open position in the overlapped state. Therefore, for example, compared with a case where a single blade opens and closes the opening 15, the respective blades can be miniaturized.

The optical instrument 1 according to the present embodiment includes the above-described FP shutter 2. Therefore, it is possible to provide the optical instrument 1 which is miniaturized and requires less power consumption while impact resistance is ensured.

The technical scope of the invention is not limited to the above-described embodiment, and various modifications can be added thereto within the scope not departing from the gist of the invention.

For example, in the above-described embodiment, a case has been described where the locking portions 67 and 68 are disposed in the drive levers 22 and 52, but the invention is not limited to only this configuration. For example, the locking portions 67 and 68 may be disposed in members interlocking with the front curtain 25 and the rear curtain 55, such as the arms 23, 24, 53, and 54, or the blades 25a to 25d and 55a to 55d.

In the above-described embodiment, a configuration has been described in which the locking portions 67 and 68, and the regulation portions 83 and 84 come into contact with each other before the front curtain 25 and the rear curtain 55 approach the opening 15. However, the invention is not limited to only this configuration.

In the above-described embodiment, a configuration has been described in which the regulation lever 73 is switched from the entry position to the escape position in a case where a power-off state is switched to a power-on state. However, without being limited to only this configuration, the operation method of the regulation lever 73 can be appropriately changed. For example, a configuration may be adopted in which at timing of pressing the release button, the regulation lever 73 is switched from the entry position to the escape position.

In the above-described embodiment, a configuration has been described in which in response to the pivoting operation of the regulation lever 73, the regulation lever 73 is switched between the entry position and the escape position. However, the invention is not limited to only this configuration. For example, a configuration may be adopted in which in response to the slide movement of the regulation lever 73, the regulation lever 73 is switched from the entry position to the escape position.

In the above-described embodiment, a configuration has been described in which the regulation lever 73 is biased toward the escape position by the biasing member 86. However, the invention is not limited to only this configuration. That is, a configuration may be adopted in which only power of the regulation electromagnetic actuator 71 causes the regulation lever 73 to pivot toward the escape position.

In the above-described embodiment, a configuration has been described in which the front curtain 25 and the rear curtain 55 are actuated using the electromagnetic actuators 21 and 51. However, without being limited to only this configuration, any actuator other than the electromagnetic actuators 21 and 51 may be used.

In the above-described embodiment, a configuration has been described in which the movement of both the front curtain 25 and the rear curtain 55 in the closing direction is regulated using the single regulation lever 73. However, the invention is not limited to only this configuration. For example, a configuration may be adopted in which the movement of at least any one of the front curtain 25 and the rear curtain 55 in the closing direction is regulated by the regulation lever (blade position holding member). In addition, the regulation lever (blade position holding member) may be disposed so as to correspond to each of the front curtain 25 and the rear curtain 55.

In the above-described embodiment, a configuration has been described in which the linkage pin 81 of the linkage lever 72 is loosely inserted into the guide hole 91 of the regulation lever 73. However, without being limited to only this configuration, any configuration may be adopted as long as the linkage lever 72 and the regulation lever 73 engage with each other while being provided with play in the pivoting direction of the linkage lever 72 pivoting around the regulation axis O3. In this case, for example, a configuration may be adopted in which a pin formed in the regulation lever 73 is loosely inserted into a guide hole formed in the linkage lever 72. In addition, an engagement method between the linkage lever 72 and the regulation lever 73 is not limited to the hole and the pin.

Alternatively, within the scope not departing from the gist of the invention, the configuration elements in the above-described embodiment can be appropriately replaced with known configuration elements. In addition, the above-described respective modification examples may be appropriately combined with each other.

What is claimed is:

1. A blade drive device comprising:
    a substrate that has an opening;
    a first curtain and a second curtain that are movable along an opening surface of the opening so as to open and close the opening;
    a first locking portion that interlocks with opening and closing operations of at least the first curtain;
    a blade position holding member that is configured to be pivotally movable around a first axis extending in a first direction intersecting the opening surface, that enters an operation trajectory of the first locking portion in response to the opening and closing operations of the first curtain, and that is capable of entry and escape between an entry position for regulating the movement of the first curtain in a closing direction and an escape position escaped from the operation trajectory;
    an electromagnetic actuator that extends in the first direction, and that is configured to be rotatable around a second axis which is different from the first axis; and
    a linkage lever that connects the blade position holding member and the electromagnetic actuator to each other, and that causes the blade position holding member to pivot around the first axis in response to the rotation around the second axis of the electromagnetic actuator,
    wherein the blade position holding member and the linkage lever engage with each other while being provided with play in a pivoting direction around the second axis of the linkage lever.

2. The blade drive device according to claim 1,
    wherein the linkage lever includes a linkage pin which is loosely inserted into a guide hole of the blade position holding member,
    wherein an inner peripheral surface of the guide hole has a first engagement portion with which the linkage pin engages in response to one side pivoting movement around the second axis of the linkage lever, and a second engagement portion with which the linkage pin engages in response to the other side pivoting movement around the second axis of the linkage lever, and
    wherein inside the guide hole in the pivoting direction of the linkage lever around the second axis, clearances between the linkage pin and the first engagement portion and the linkage pin and the second engagement portion configure idle running regions in which the linkage pin runs idle with respect to the blade position holding member in response to the pivoting movement around the second axis of the linkage lever.

3. The blade drive device according to claim 2,
    wherein the inner peripheral surface of the guide hole has an escape portion which escapes from contact with the linkage lever in a radial direction of the second axis.

4. The blade drive device according to claim 1, further comprising:
    a biasing member that biases the blade position holding member toward the escape position.

5. The blade drive device according to claim 1,
    wherein at the entry position, the blade position holding member is locked by the first locking portion in an open region in which the first curtain escapes from the opening when views in the first direction.

6. The blade drive device according to claim 1,
    wherein the first curtain and the second curtain respectively have a plurality of blades, and
    wherein in an overlapped state where the plurality of blades are overlapped with each other when viewed in an opening direction of the opening, the plurality of blades escape from the opening so as to bring the first curtain and the second curtain to an open position, and
    wherein in an expanded state where the plurality of blades are expanded when viewed in the opening direction, the plurality of blades close the opening so as to bring the first curtain and the second curtain to a closed position.

7. The blade drive device according to claim 1, further comprising:
    a second locking portion that interlocks with the opening and closing operations of the second curtain,
    wherein at the entry position, the blade position holding member enters both an operation trajectory of the first locking portion operated in response to the opening and closing operations of the first curtain and an operation trajectory of the second locking portion operated in response to the opening and closing operations of the second curtain so as to regulate the movement of the first curtain and the second curtain in the closing direction.

8. An optical instrument comprising:
    the blade drive device according to claim 1.

* * * * *